UNITED STATES PATENT OFFICE.

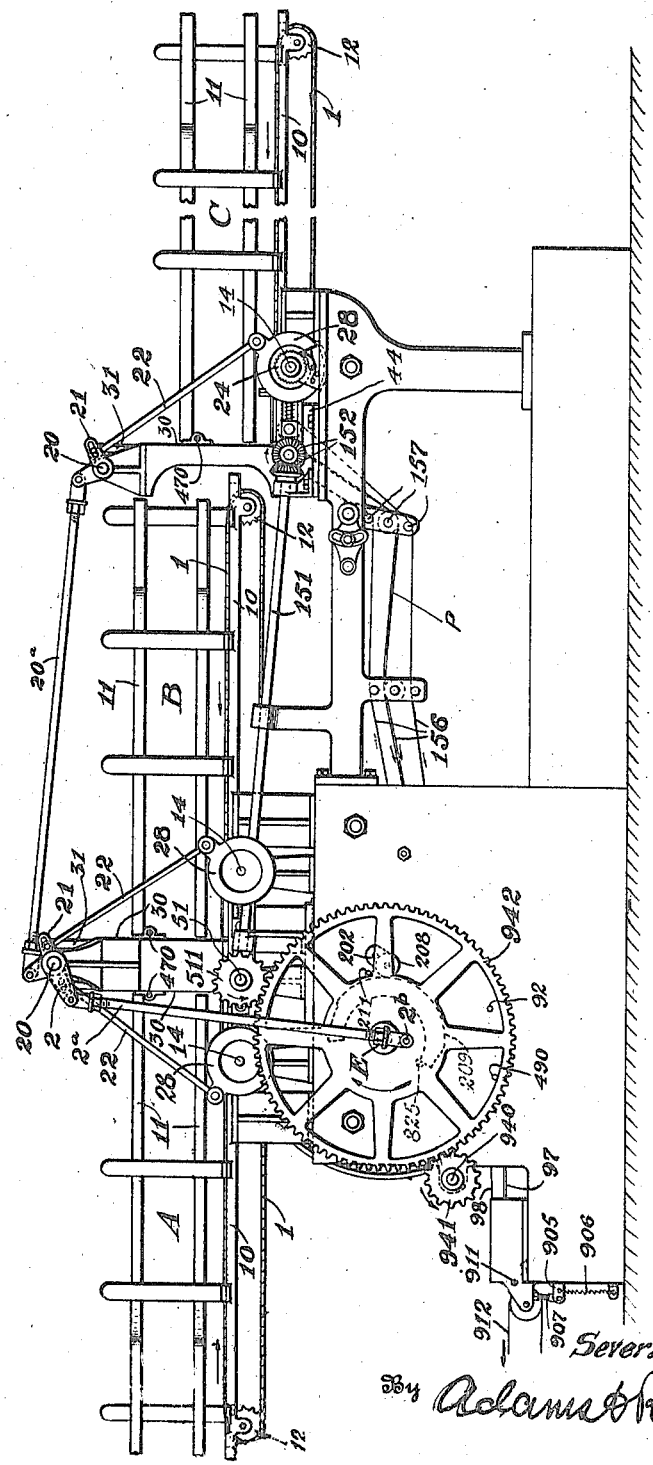

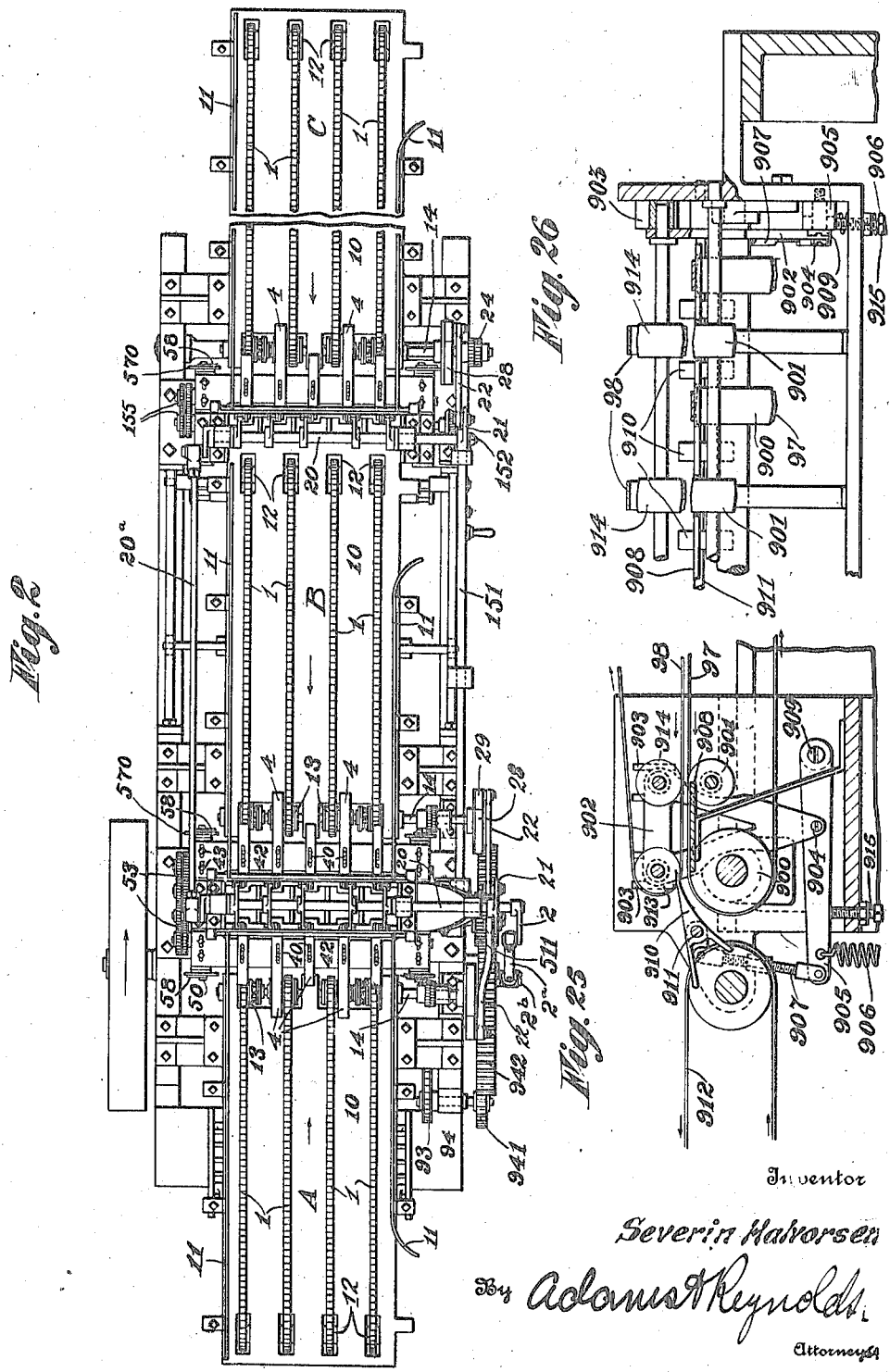

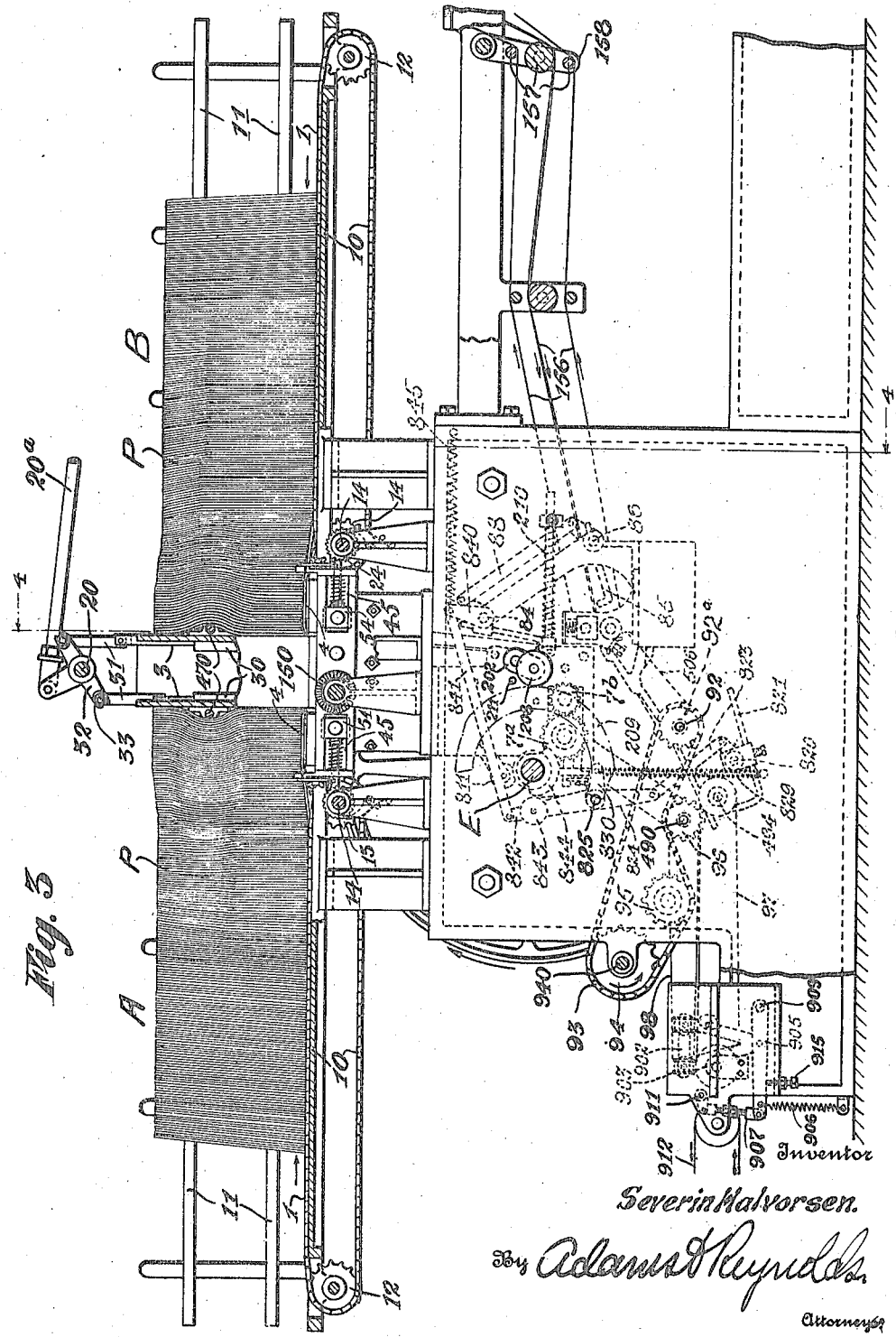

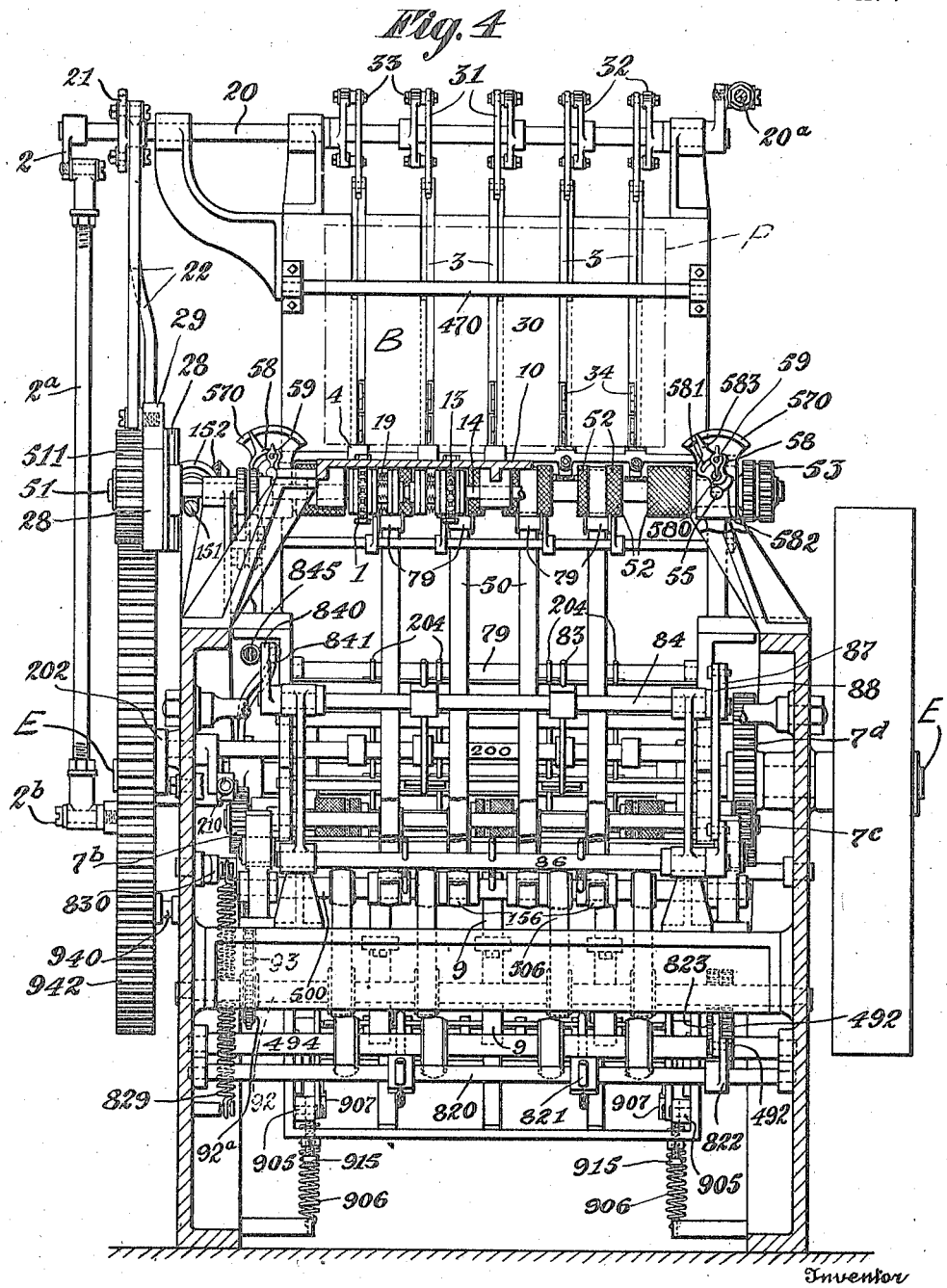

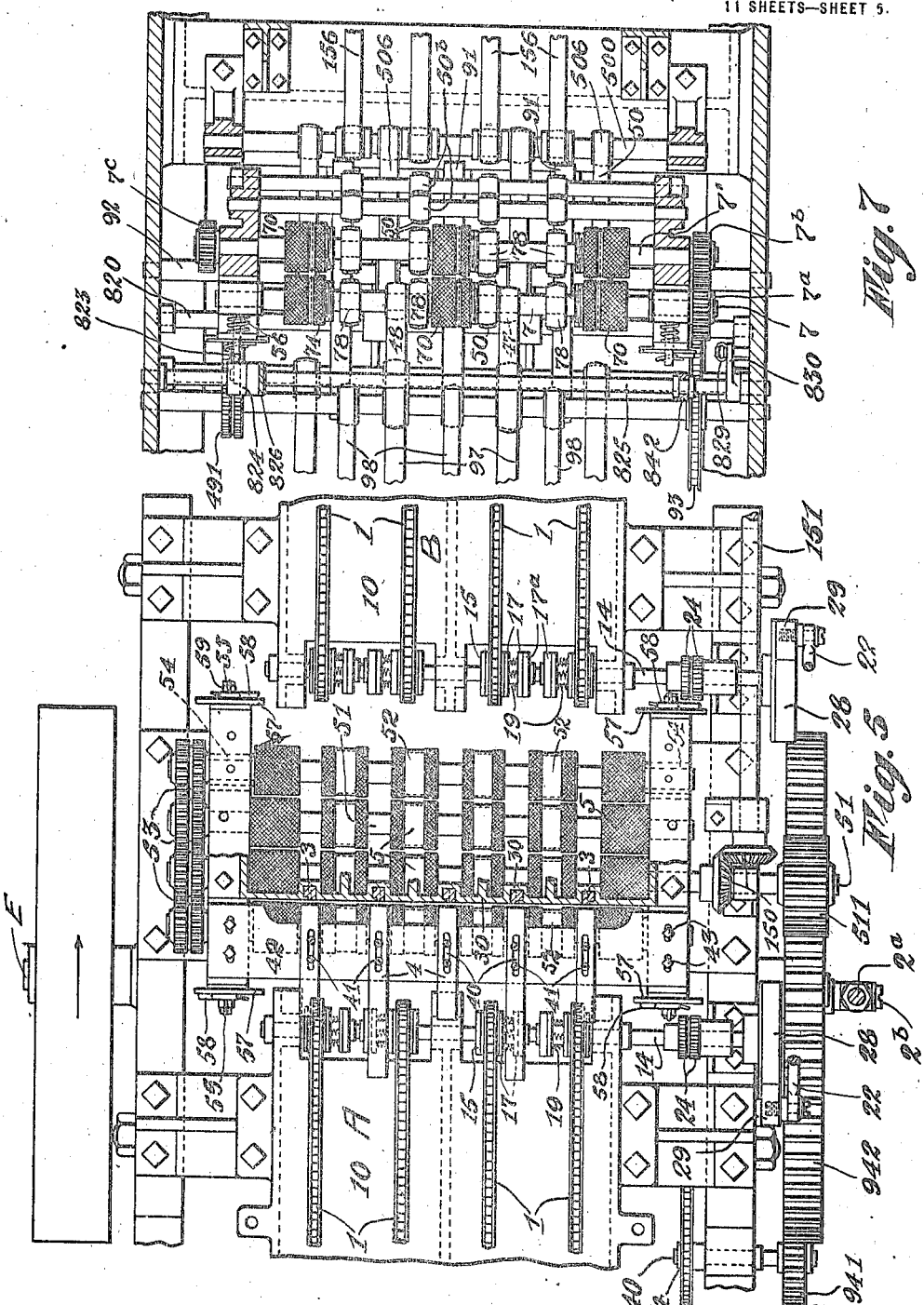

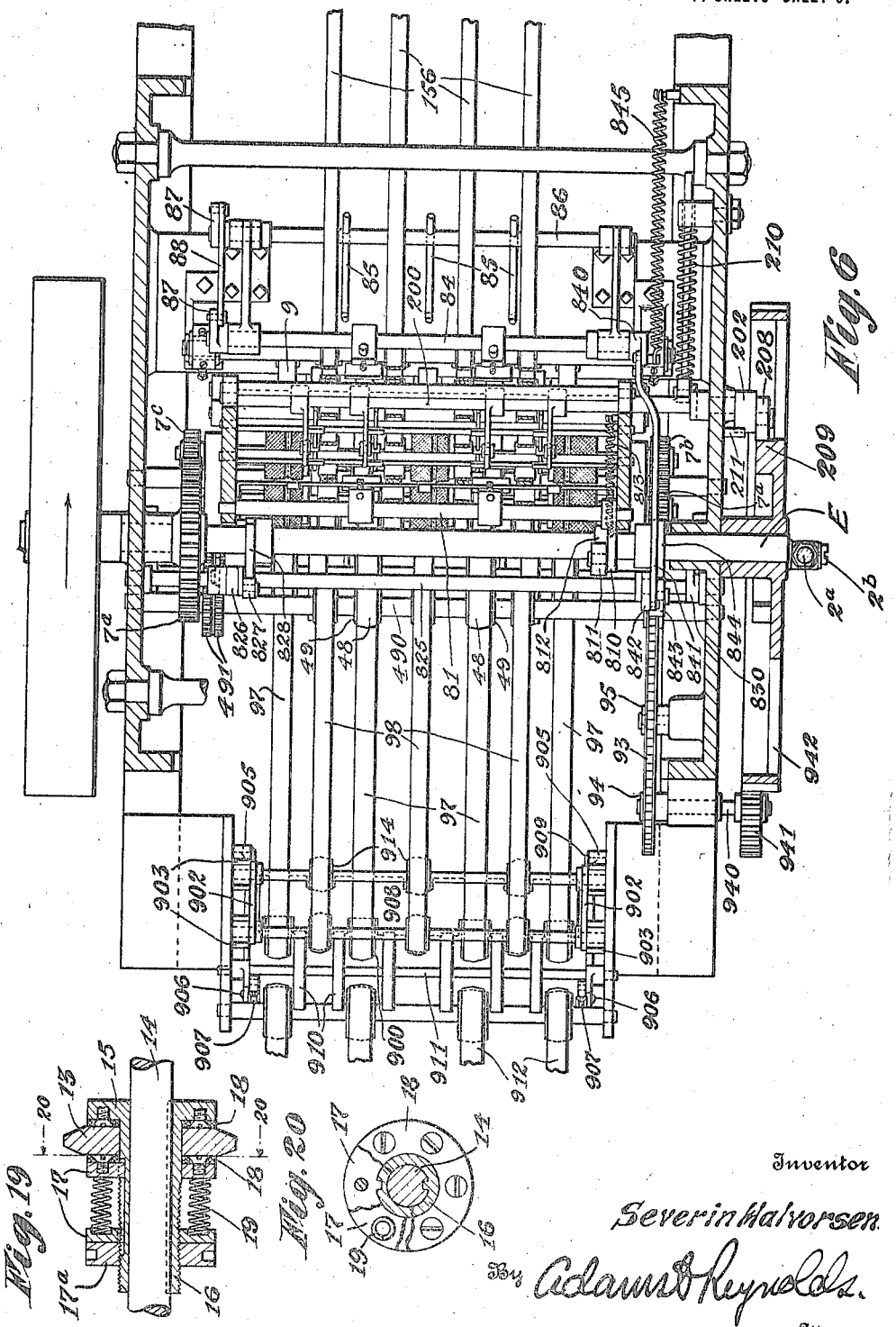

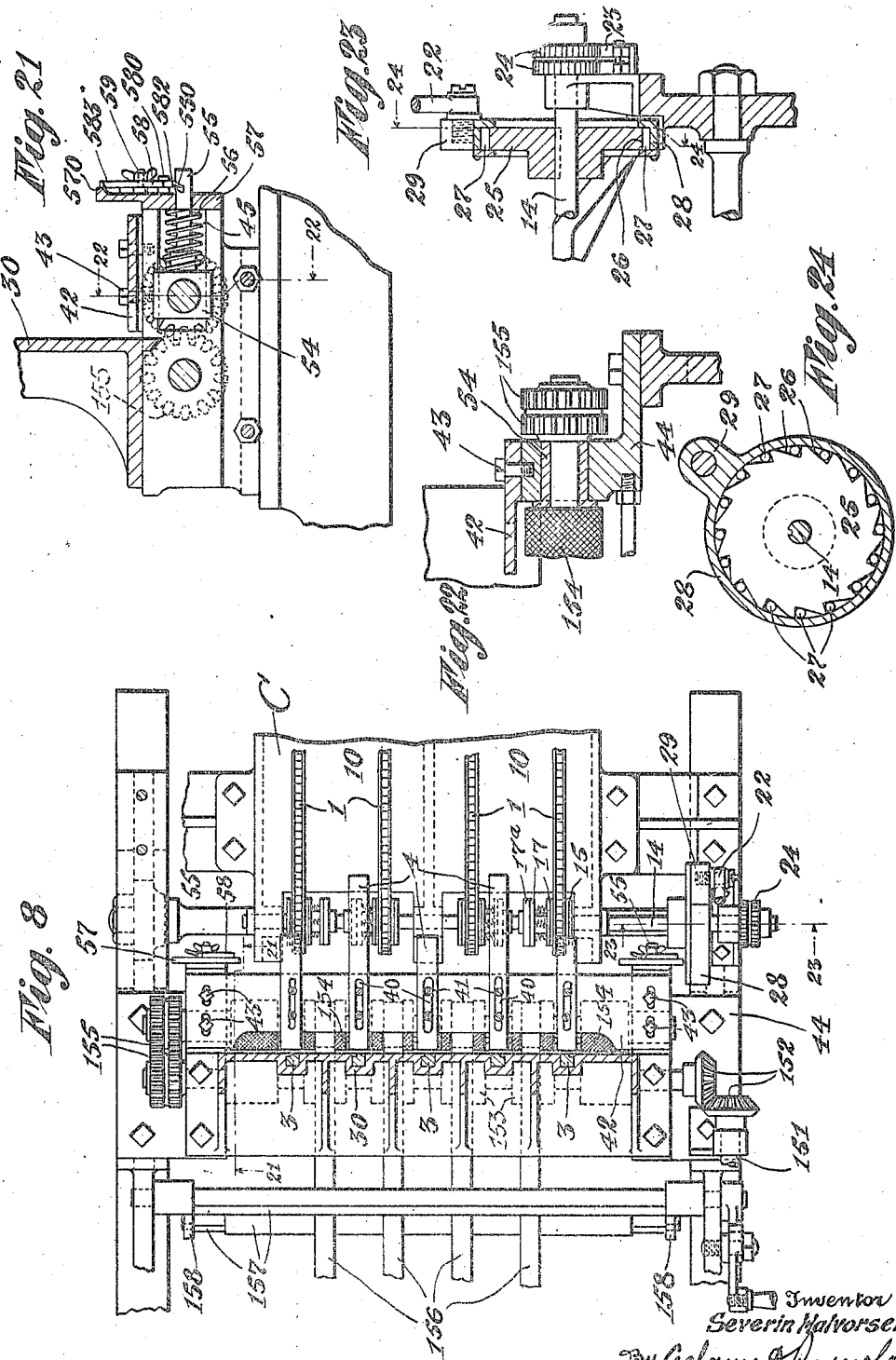

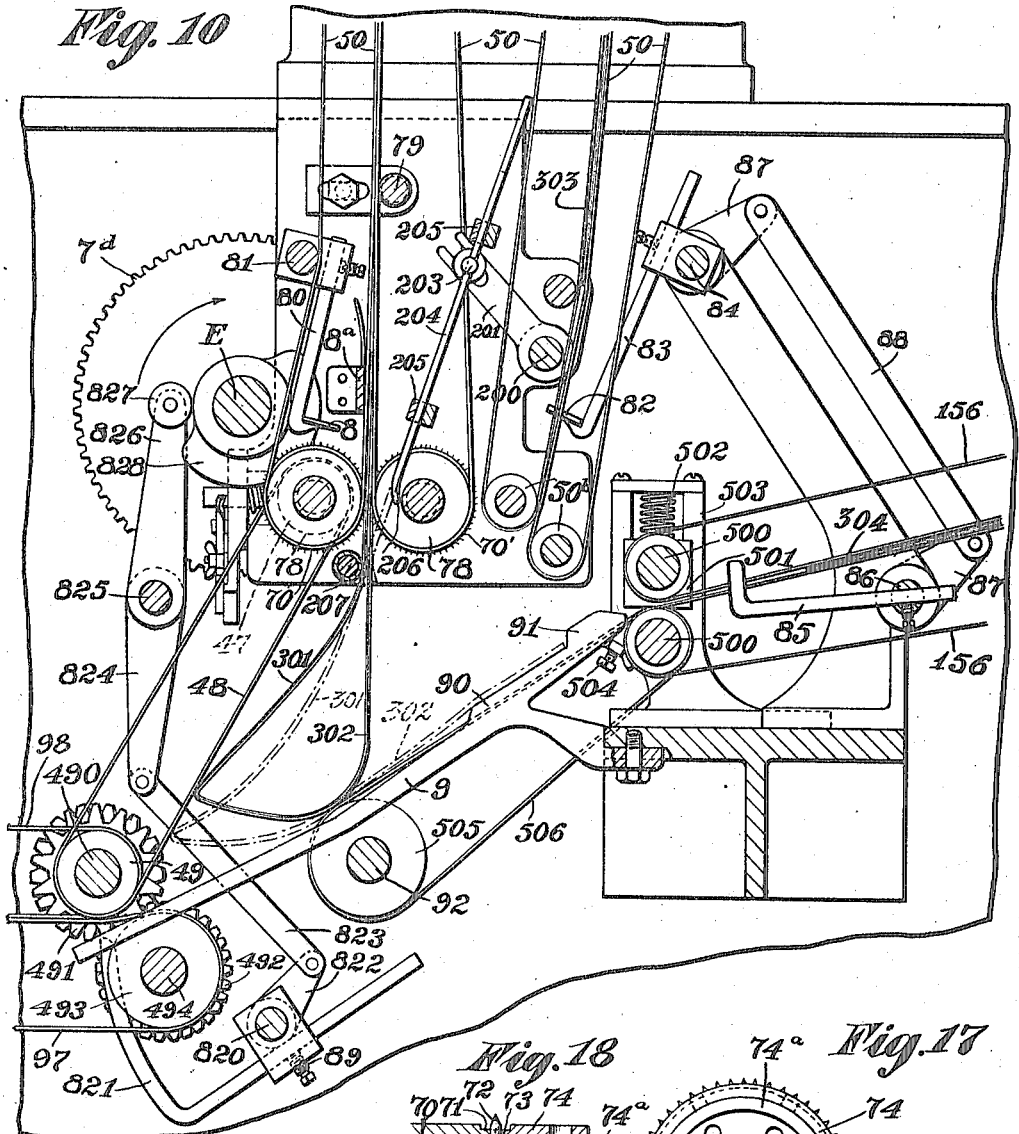
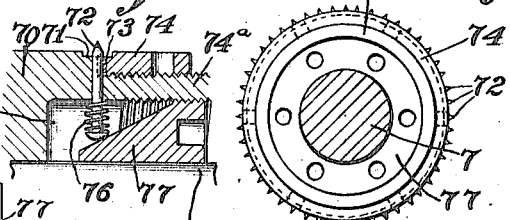
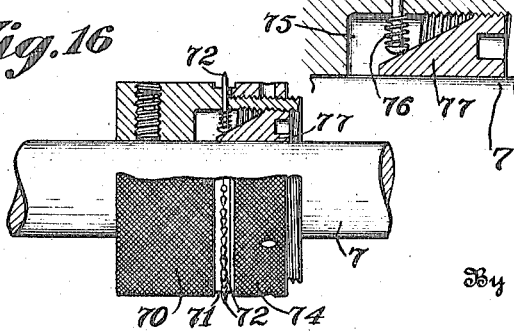

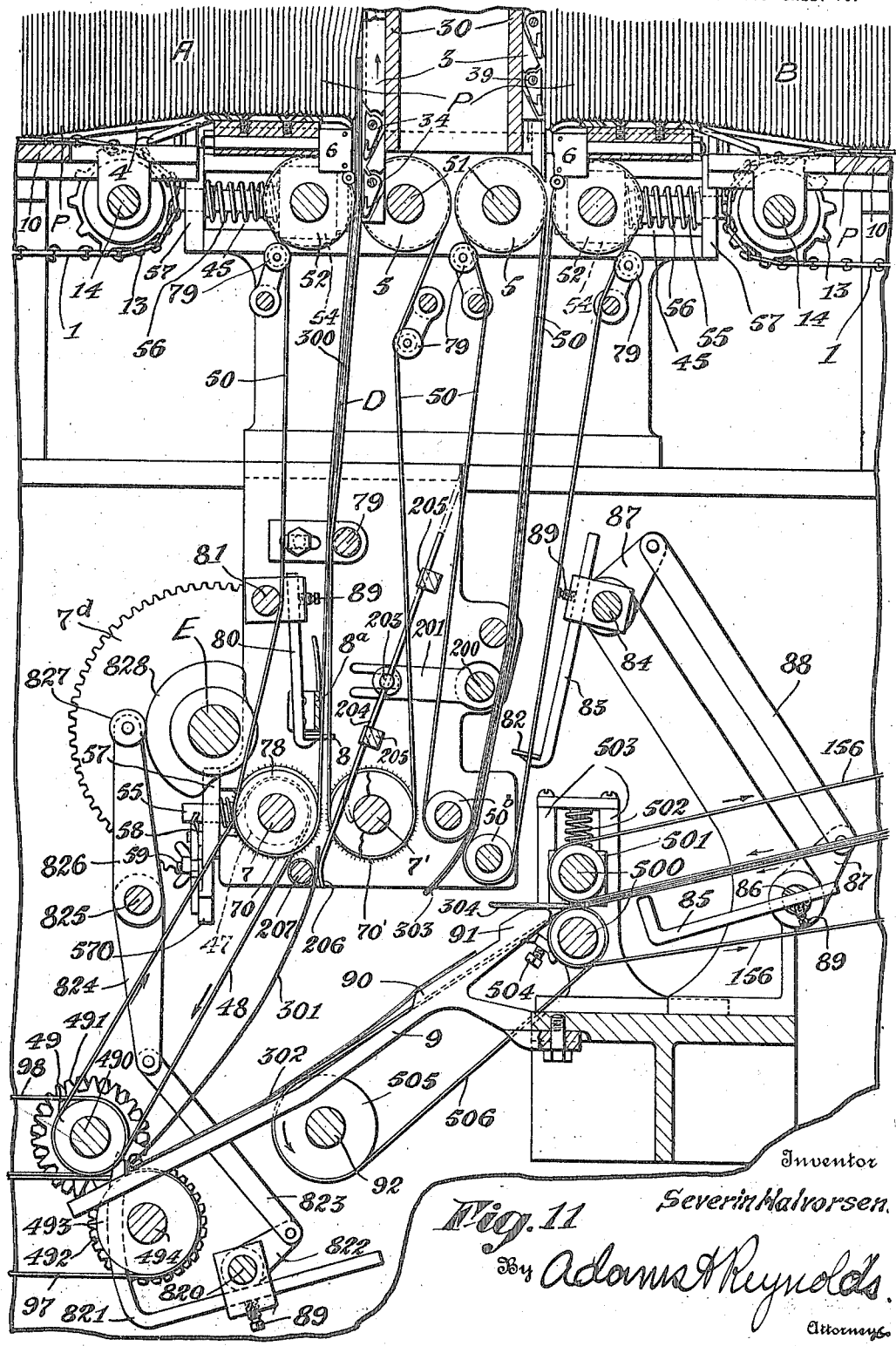

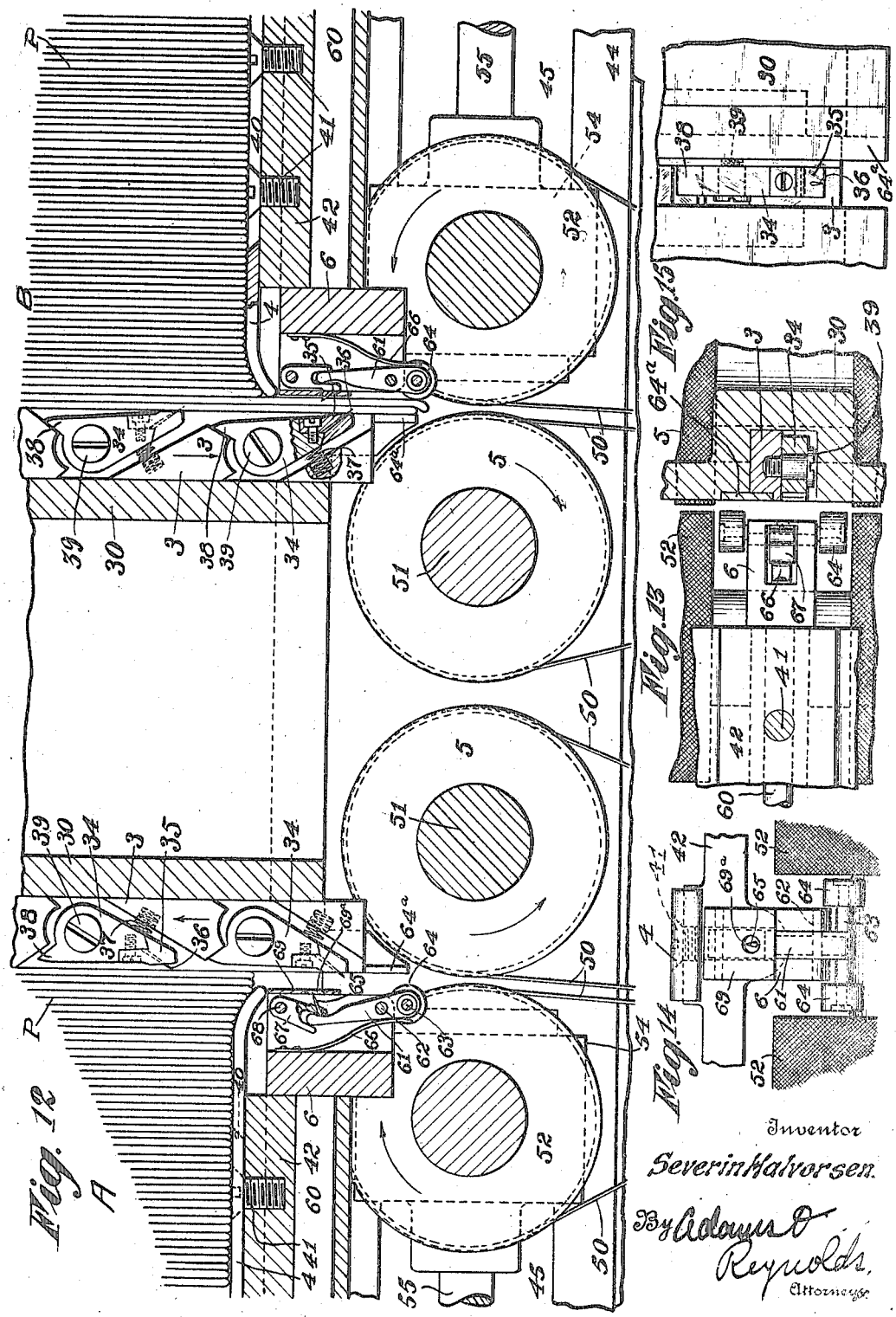

SEVERIN HALVORSEN, OF SEATTLE, WASHINGTON, ASSIGNOR TO THE NEWSPAPER STUFFING MACHINES COMPANY, OF SEATTLE, WASHINGTON, A CORPORATION OF WASHINGTON.

NEWSPAPER-STUFFING MACHINE.

1,257,482.  Specification of Letters Patent.  Patented Feb. 26, 1918.

Application filed June 10, 1915. Serial No. 33,311.

*To all whom it may concern:*

Be it known that I, SEVERIN HALVORSEN, a citizen of the United States of America, and resident of Seattle, in the county of King and State of Washington, have invented certain new and useful Improvements in Newspaper-Stuffing Machines, of which the following is a specification.

My invention relates to apparatus designed for assembling the several sections of a newspaper so that one section constitutes a cover or inclosing section and the other sections are within the cover section. The process of assembling the parts of a paper is generally referred to as "stuffing." I have therefore termed my invention a newspaper stuffing machine.

The object of my invention is to provide an apparatus which is capable of stuffing papers at a high rate of speed and which is reliable and accurate in its work.

The particular features of which my invention consists will be hereinafter set forth and then particularly defined in the claims.

In the accompanying drawings I have shown my invention embodied in the forms which are now most preferred by me.

Figure 1 is a side elevation of the machine, the view being from the side containing most of the operating connections and that occupied by the operator.

Fig. 2 is a top plan view of the complete machine.

Fig. 3 is a side elevation similar to that of Fig. 1 except that parts of the machine are broken away and much of the working parts at the interior of the machine are shown in dotted lines.

Fig. 4 is a transverse sectional elevation taken on an irregular or offset plane indicated approximately by the line 4—4 of Fig. 3.

Fig. 5 is a horizontal section of the central part of the machine taken on a plane above the paper carrying table, except that the paper supporting fingers at the end of one set of feed chains are removed.

Fig. 6 is a horizontal section taken on a plane just below the paper carrying table and its feed chains, showing the central parts of the machine.

Fig. 7 is a horizontal section taken at a still lower level through the parts which deliver the paper sections to the stuffing point.

Fig. 8 is a horizontal section on an offset plane, mainly above the paper feeding and supporting table of that section which is at the right hand as the machine is shown in Figs. 1 and 2.

Fig. 10 is a like view showing in detail the mechanisms which open the cover section and insert the filler sections, the sections of the paper being shown in one position.

Fig. 11 is a view similar to Fig. 10 except that the paper feeding mechanisms are also shown and the paper sections are in a different position, the cover section having been opened and the filler sections being about to be entered therein.

Fig. 12 is a longitudinally extending vertical section showing in detail the mechanisms by which the paper sections are separated from the pile and started to the assembly point.

Fig. 13 is a detail showing in plan, partially in section, the section feeding device and the device which prevents feeding more than one section at a time.

Fig. 14 is an elevation of one of the devices which prevents feeding more than one section at a time.

Fig. 15 is a face view of one of the needle carrying devices by which the paper sections are separated from the pile and started on their course.

Fig. 16 is a side view and partial longitudinal section of one of the needle carrying rolls used to open the cover section for the insertion therein of the filler sections.

Fig. 17 is an end view of the same rolls, its shaft being in section.

Fig. 18 is a fragmentary section of one of these rolls showing its details of construction and needle adjusting means.

Fig. 19 is a longitudinal section and Fig. 20 an end view with parts broken away, showing one of the friction driven sprocket wheels which actuate the paper feeding chains.

Fig. 21 is a section on the line 21—21 of Fig. 8, showing the means for adjusting the separation of the tape carrying rolls.

Fig. 22 is a section on the line 22—22 of Fig. 21.

Fig. 23 is an axial section on line 23—23 of Fig. 8 through the feed clutch used for operating the feed chains.

Fig. 24 is a face view, the casing being in section, of the feed clutch.

Fig. 25 is a vertical section taken just inside one of the side frames, showing the mechanism by which an imperfectly stuffed paper is shunted to one side.

Fig. 26 is a vertical section, taken transversely of the machine, showing the same device.

Figure 9:
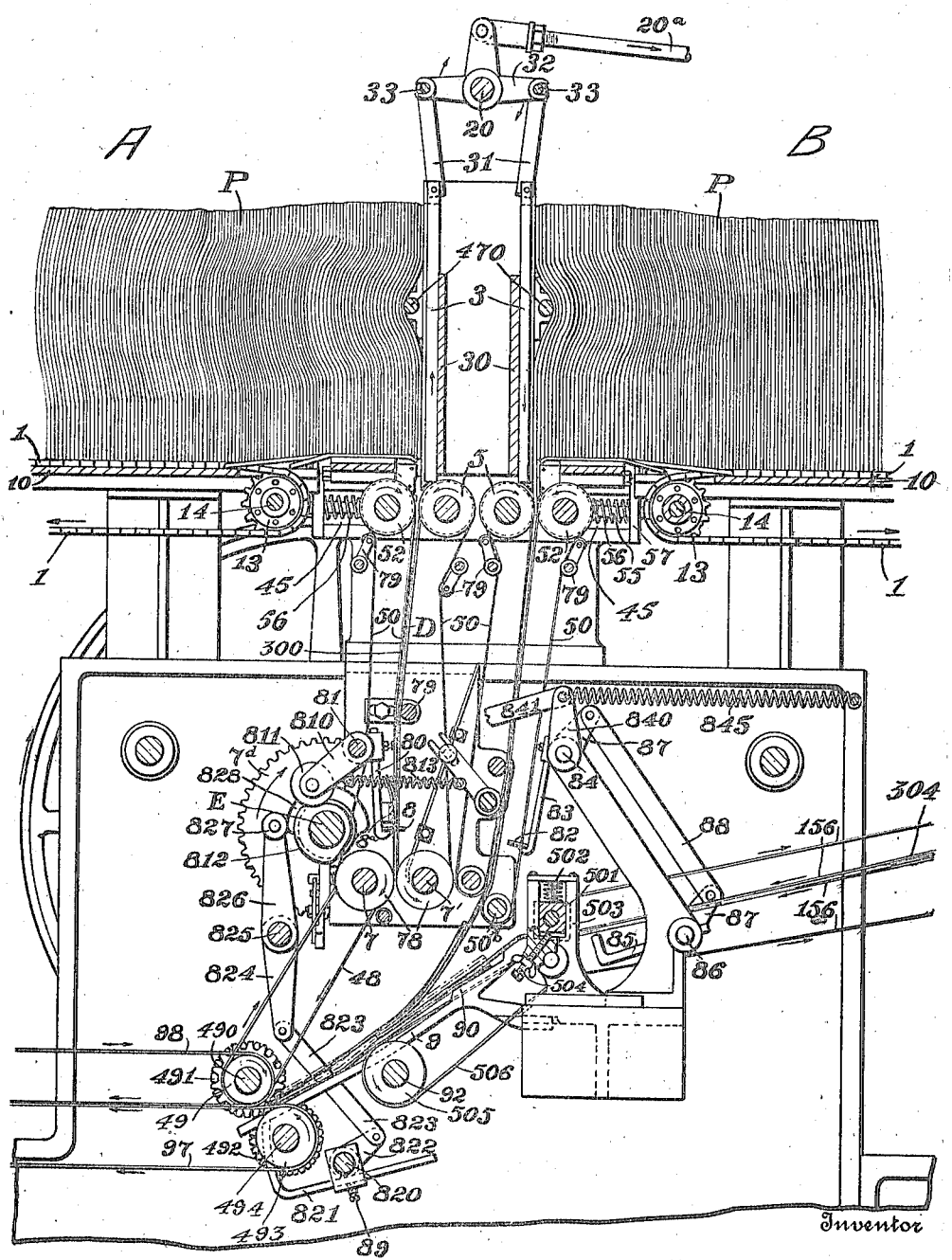
Fig. 9 is a vertical longitudinal section taken just inside the frame, showing the central zone of the machine, particularly the paper feeding and assembling mechanisms.

I have herein referred to my device as a newspaper stuffing machine and will so describe it, although it may be used for assembling sections of pamphlets, books, circulars and other similar products. A specific reference to such uses is not deemed necessary in the description of the mechanism employed and its principles of operation, it being understood that it is intended to employ these mechanisms for any and all purposes for which they are adapted.

In the drawings I have shown mechanism capable of assembling two newspaper sections within a third, that is, a machine capable of stuffing a paper composed of three sections. A machine of this character and capacity is believed to be capable of handling and stuffing the various sections of substantially all editions put out by even the largest papers.

Where such editions are composed of more than three sections, some, or many, of these sections, will be printed in advance, and these may be stuffed in advance and these stuffed sections then be treated in the same manner as were the unit sections of which they are composed, to assemble the whole within a cover section. Some of the unit sections may also be run collect on the press. If desired, however, it would be an easy matter to add other paper delivering mechanisms, to deliver their sections at the point of assembly, within the cover section.

I provide a series of feeding tables or racks for the reception of the paper section which are to be assembled, these corresponding in number with the number of sections to be assembled. I have shown three, these being indicated respectively by reference characters A, B and C, for purposes of separate reference. These are each essentially alike in their construction and operation and a description of one will suffice for all.

In the drawings I have shown these paper receiving and feeding tables as arranged in line, A and B being at the same level and C at a slightly lower level. This arrangement is, to a certain extent, arbitrary. The conducting of the paper sections from feeding tables, otherwise located and arranged, to the point of assembly, would be a simple matter.

In the machine as herein shown, the papers are arranged in vertical position, the folded edge down and resting upon the feeding table. The position occupied by the papers in the separate piles, is immaterial, except as it may affect the operation of the particular mechanism employed by which the individual sections are detached from the pile and delivered to the conveying mechanisms.

The mechanisms employed in this machine may be grouped, in accordance with their function, into three groups, as follows. First, the means for supporting and feeding the paper sections, one at a time. Second, the conveying mechanism. Third, the paper opening and inserting mechanism. While the mechanisms of these groups are all dependent upon each other to a certain extent, the mechanisms of a particular group may be varied without necessarily affecting the mechanisms of the other group.

The paper sections are stacked in piles P upon the feed table 10, as is indicated in Figs. 3, 9 and 12. Guide bars 11 engage the ends of the papers to keep them in place. Paper feeding means are employed to secure gradual movement of the pile of papers toward the point where they are removed, one at a time, and delivered to the conveying means.

With the papers vertically disposed, as shown, the conveying means which I have chosen, consists of a series of endless chains 1, which have one run passing over the table 10 toward the paper delivering end. The wheels at one end, as the wheels 12, may be idlers. The other wheels, as 13, are the drivers.

I prefer that the driving wheels, 13, be yieldingly driven, so that they may advance as fast as the papers are taken away, but no faster. I therefore employ a friction actuated device to drive the chains. I have also preferred to employ a separate friction drive for each wheel 13. A preferred construction for this is shown in Figs. 19 and 20.

Shaft 14 has a member secured thereto consisting of a sleeve 16 and a flange or disk 15 at one end. Mounted to freely turn upon the sleeve 16 is the sprocket wheel 13. Two disks 17 are mounted to turn with the sleeve 16 and to be free to move lengthwise thereon, as by having intermeshing key and keyway. One disk 17 and the flange or disk 15 has a washer 18 of a material making a good friction bearing, as fiber, which engages opposite sides of the wheel 13. Between disks 17 are springs 19 which act under compression to grip the wheel 13 and turn it. A threaded backing nut 17$^a$, takes the thrust of the springs in one direction and may be adjusted to vary the pressure upon the wheel 13.

Each shaft 14 is turned through a friction clutch device, a preferred form being shown in Figs. 23 and 24. This comprises a wheel or disk 25, secured to shaft 14 and having a series of inclined surfaces 26 and inclosed within an encircling band or case 28, which is oscillated through a rod 22, which is connected with an arm 29. Rollers 27 engaging between inclined surfaces 26 and casing 28, permit free movement in one direction, but bind the two together when moved oppositely. To insure against back movement, a reversely acting clutch or ratchet mechanism may be employed, as the ratchet wheels 24 and pawls 23.

The rods 22 are actuated by engagement with rock arms 21 carried by rock shafts 20. The two rock shafts 20 are connected by a rod 20$^a$. The rock arms 21 are slotted to permit adjustment of the point of connection of rods 22 to vary its movement. The amount of feed is thus adjusted to the thickness of the paper sections being handled. One of the shafts 20 is actuated through an arm 2 and rod 2$^a$ from a crank pin 2$^b$.

The above mechanisms will deliver the paper sections to the point where the feeding mechanisms act upon them. The paper feeding mechanisms which I prefer to employ in the type of machine herein illustrated is as follows:

Vertical plates 30 have vertical grooves or guide ways which receive vertically reciprocable feed bars 3. These are actuated through links 31 which connect them with rock arms 32 carried by rock shaft 20. For easy engagement and disengagement, the ends of rock arms 32 may be slotted and the pins 33 clamped therein by any suitable means.

Upon their lower ends bars 3 carry paper feeding pins. This mechanism is shown in detail in Figs. 12 and 13. One side of the rod 3 is recessed to receive a block 34 which is pivoted to swing freely upon securing bolt 39. A spring 37 acts to swing its needle carrying end toward the pile of paper sections. A finger 38 contacting with a shoulder of the recess in the bar 3 limits this movement. A separate block 35 forms the paper engaging end of this member and has therein a hole for the reception of a needle 36. A series of these needle carrying blocks are secured to each rod 3.

The paper supporting table, at the paper feeding end, terminates in a series of flat bars 4, which are adjustable to vary the distance separating their ends from the feed bar 3, thereby determining the width of the opening through which the papers are fed. The bars 4 are shown as having a longitudinal slot 40 through which the securing screws 41 pass. The plates 42 to which the bars 4 are secured, are secured to the frame by screws or bolts passing through transversely extending slots at their ends, as shown at 43, in Fig. 8, whereby the plate and all the fingers or bars 4 may be adjusted together.

When the feed bars 3 are reciprocated, they have no effect to move the papers on their upward or retractive stroke, but on the downward stroke, the needles 36 engage the outermost paper section to carry it down until it is engaged by the feed rolls 5 and 52 and the feeding and conveying tapes 50, 52 carried by these rolls. The shafts 51 of these rolls are connected by gears 53 (see Fig. 2), so that they rotate in unison.

Rolls 5 and 52 of each pair are spaced apart to pass a paper section between them and to press firmly upon it in passing. The shafts of rolls 52 are journaled in blocks 54, which may be adjustable in slots 45 of a member 44 which is fixed to the frame.

Block 54 is adjustable to vary the separation of rolls 5 and 52. It has a stem 55 which projects through a part 57 of the frame. The adjustment provided consists of a slot 550 cut across the outer end of stem 55 and an adjusting plate 58 which is pivoted at 580, and is secured in adjusted position by a clamping bolt 59, which passes through an arctuate slot 581 in the plate 58. The lower edge 582 of this plate is inclined to act as a cam against the side faces of the slot 550, to thereby move stem 55 when plate 58 is turned upon its pivot bolt. An index finger 583 may be used with an index arc 570 as a guide for the amount of adjustment. A spring 56 holds the roll 52 yieldingly toward roll 5 and takes up whatever slack there may be in the positive adjusting means employed.

The plate or bar 42, carries a series of mechanisms which are designed to prevent the feeding of more than one paper section at a time. The preferred construction of these is shown in detail in Figs. 12, 13 and 14, and is as follows:

A block 6 is recessed in a socket formed in the edge of plate 42, beneath each of the bars 4. A stem 60 fixed to this block forms a securing bolt. Needle lever 67 is pivoted at 68, back of a protecting plate 69 which has a hole 69$^a$ through which needle 65 may project. Needle lever 67 has a sliding or free connection with its operating lever 61, this being shown as a yoke or slot in the end of lever 67, into which the free end of lever 61 enters. Lever 61 is normally held retracted, or in the position shown at the left hand in Fig. 12, by the spring 66. On the lower end of lever 61, rollers 64 are mounted by pivot axes 63.

These devices are adjusted so that there is room for the paper section to freely pass between rollers 64 and the opposed fixed plate 64$^a$, without forcing back the rollers. Under such conditions the needles 65 are not projected. If however, two paper sections should start together, as has been shown at the right hand in Fig. 12, the added thickness will force back the rollers 64, thus projecting the pins 65 and catching and retaining the second paper until its turn comes.

I have found that the effort required to remove a paper is very much reduced if the face of the outer paper is held off from the plate 30, as by a roller or bar 470. A paper after being fed between the rollers 5, 52, is conveyed by the tapes 50 to the point of assembling or "stuffing." Tape tighteners 79, of any suitable type may be used. The tapes 156 which deliver the papers from the third stack at C, are lengthened and provided with whatever guide rollers may be needed.

The stack of papers at A are those destined to form the cover or news section of the stuffed paper. The papers of the stacks at B and C may be respectively the color and the classified sections, or may each be composed of two or more sections which have been previously stuffed.

By reason of operating the paper feed bars 3 for sections A and B, from opposite ends of the same oscillating levers 32, these sections are started alternately. In the position shown in Fig. 9, the bars 3 are at the middle of their stroke, the direction of their movement being indicated by the arrows carried by each. The cover or news section which has just been started out is shown at D, between tapes 50, its lower edge not yet having reached the lower tape rollers 78. The shafts 7, 7', which carry the tape rollers 78, also carry the cover-opening rollers 70, 70', which are shown in detail in Figs. 16, 17 and 18. These opening rollers are alternated on the shafts with the tape carrying rollers 78, as is indicated in Figs. 4, 6 and 7. Tape rollers 78 are not secured to shafts 7 and 7', but are free to turn thereon.

These opening rollers should be of such construction as will promptly and securely grip the papers and control them without slippage, as their proper functioning depends upon this. To secure this result I have provided them with needles which positively engage the paper.

The main body 70 of these rollers is fixed to the shaft and is cupped out or hollowed at one end, making a cavity 75 which is interiorly threaded to receive a needle projecting cone 77. A series of needles 72 have their heads engaged by the coned surface, whereby their projection may be adjusted by adjustment of the cone 77.

Springs 76 acting against the heads of the needles, withdraw them as permitted by backward movement of cone 77. The section 74 is a band nut screwing upon the reduced collar 74ª. Between this band nut and the projecting needles is interposed a ring 73 of copper or like relatively soft metal into which the needles may be made to sink slightly on tightening the needle-clamping band-nut 74. The tape carrying rollers 78 run loose on the shafts 7, 7'.

The shafts 7, 7' are connected by gears 7ª and 7ᵇ, of which the latter is the smaller, so that shaft 7' turns the faster. Shaft 7' has a gear 7ᶜ which meshes with gear 7ᵈ on the main drive shaft E.

The tapes 50 which bring down the paper sections from the stack B, at their lower ends pass over idlers 50ᵇ, of which the one farthest removed from the opening needle rolls 70, 70', is located slightly lower and under the other, thus making adjustment for differing thicknesses of paper sections unnecessary, and also giving the paper a lateral deflection toward and into the opened cover section. The shafts carrying the idlers 500 for the tapes bringing the third paper section from the stack C, are made relatively adjustable by mounting one shaft in blocks 501 which may move in guides 503, springs 502 holding these rollers yieldingly together, and adjusting bolts 504 limiting their approach. These tapes discharge their papers horizontally into the opened cover section.

I provide a series of stops which are operated to check and time the various paper sections so that the delivery of the filler sections may be properly timed with the opening of the cover section.

Stops 8, for the cover section, are carried by arms 80 secured to rock shaft 81, to swing into and out of the path of the cover section to momentarily check it just above the opening rolls 70, 70'.

Stops 82 are similarly carried by arms 83 secured to rock shaft 84 to control the delivery of the first filler section. Stop 85 carried by rock shaft 86 controls the time of delivery of the second filler section. Rock shafts 84 and 86 are connected through rock arms 87 and link 88. A stop 821, carried by rock shaft 820 engages the cover section to hold it in position for receiving the filler sections. The stop-carrying arms 80, 83, 85 and 821, may be adjusted by loosening set bolts 89.

Rock shaft 81 is actuated to withdraw stop 8, through arm 810 which carries roller 811, engaging cam 812 mounted on the main shaft E, spring 813 throwing the stop into active position. See Fig. 9. A bar 8ª outside the tape holds tape and paper back while these stops are being withdrawn.

Rock shaft 820 carries rock arm 822, which is connected by link 823 with rock arm 824 carried by rock shaft 825, which shaft is rocked through rock arm 826, roller 827 and cam 828 upon main shaft E. Spring 829 acting through rock arm 830, draws the stop into active position.

Rock shaft 825 also serves as a pivot bearing for a rock arm 842, which carries cam roller 843, engaging cam 844 secured upon the main shaft E. See Figs. 3 and 6. Rock arm 842 is connected by link 841 with rock arm 840, secured to rock shaft 84. Spring 845 retracts these parts, holds cam roller 843 against its cam, and throws stops 82 and 85 into active position.

Paper supporting and guide fingers 9, receive the papers while being stuffed. These extend from beyond the stops 821 upwardly at an angle, approximately as shown, to the delivery ends of tapes 156. Supplemental tapes 506, passing over pulleys mounted upon shafts 500 and 92, are also used. Fingers 9 have raised portions 90 and 91 which hold the upper edges of the paper clear of the tapes 506, but are depressed so as to cause the paper to contact with the tapes below the ledge 90.

Tapes 97, 98, passing over rolls 493 and 49, convey the stuffed papers away. Tapes 48 connect rollers on shaft 7 with rollers on shaft 490. The latter assist in the opening of the cover section in a manner which will be later explained.

A rock shaft 200 carries rock arms 201 which are slotted at their outer ends and embrace pins 203 carried by paper holding fingers 204 which reciprocate in guides 205. The lower ends 206 of these fingers extend beneath the discharge opening between the paper opening rolls 70 and 70'. A bar 207, positioned to be engaged by the lower ends of these fingers, coöperates to hold between them the upper edge of one side of the opened cover section, as is shown in Fig. 11. Shaft 200 carries a rock arm 202, and this a roller 208 which is in position to engage the sectional cam flange 209, to thereby give the fingers 204 a reciprocating movement to raise them, as is shown in Fig. 9, or depress them, as in Fig. 11. In Fig. 10 both positions are shown, one being in broken lines. Spring 210 acts upon an arm carried by shaft 200, to hold the roller in contact with its cam and to normally hold the fingers 204 raised. A stop 211 limits the movement given by the spring.

The tapes 48, 97, 98 and 506, are all turned by a chain 93 which engages wheels 94, 95, 96 and 92ª to turn them, the wheel 95 being an idler. See Figs. 3 and 6. Shaft 940 carries wheels 94 and 941, the latter engaging wheel 942 carried by the main shaft.

The tapes 156 are driven from their outer end. They pass over rollers 153, 154, which are connected by gears 155 and are driven through bevel gears 152 from a shaft 151, which is driven through bevel gears 150, from one of the feed rollers of the sets which feed the paper sections from stack A or B. This is preferably the roll whose shaft, 51, carries pinion 511 meshing with main gear wheel 942. Tapes 156 pass about idlers, as 157, carried upon an adjustable arm 158, whereby their tension may be adjusted.

The papers after stuffing are fed through tapes 97, 98 to a device which will test them and pick out any paper which has received less than the proper number of sections. This device is shown in the general view, Figs. 1 and 3, and in detail in Figs. 25 and 26. It is not herein specifically claimed as this is to be made the subject of a separate application for patent.

The lower delivery tape 97, passes over roller 900, and upper tape 98 over roller 913. Detector rollers 901 and 914 are placed opposite each other with the outgoing sides of tapes 97, 98 passing between them. Roller 901 is fixed while rollers 914 and 913 are mounted on a frame 902 which may be vertically moved within guides 903 and is supported by pivotal connection at 904 from lever 905 which is pivoted at 909. Adjusting bolt 915 limits downward movement and therefore controls the minimum approach of rollers 913, 914 to rollers 900 and 901. Spring 906 assists prompt drop of rollers 913, 914 after their having been raised.

A link 907, of adjustable length, connects lever 904 with a switch 910, pivoted at 911. This switch normally tends to assume the position shown in Fig. 25, in which the papers would be shunted downward, beneath conveyer 912. With rollers 913 and 914 raised, the switch point would be depressed and the papers would pass out upon the conveyer 912. A fixed table or plate 908 lies just within the lower delivery tapes 97 under detector rollers 913 and 914.

This device is set to provide a separation between rollers 900, 901 and rollers 913, 914, to correspond with the thickness of a properly stuffed paper. Such a paper entering between these rollers will raise the upper rollers and the frame and through lever 905 and link 907, depress the point of the switch 910, thus directing the paper upon the conveyer 912. Should the paper be lacking some of its sections, it will be thinner and will not raise rollers 913, 914 and the switch point will be retained in raised position and the paper shifted downwardly.

The operation of the machine is as follows:

The various sections which, assembled, form the complete paper, are placed in their proper places, as has been indicated by the stacks A, B, C, the cover section being placed at A. The reciprocating needle bars will each discharge a section at a time between the tapes.

As the cover section reaches a point approximately indicated as 300 in Fig. 11, a section from stack B is started through its tapes. The cover section is momentarily checked, if this is necessary, by stop 8. This position is shown in Fig. 9, wherein the second section is just entering between its tapes.

When the cover section is released from stop 8, it passes between the paper opening or needle rolls 70, 70'. The roll 70' running faster than the roll 70, feeds its half 302 of the paper faster than roll 70 feeds its half 301, producing the ballooning effect shown by the full line position of Fig. 10. In this position the half 302 is about to be discharged by the roll 70'. In this position the half 302 of the paper contacts with the tapes 506, which tends to throw and hold the fold against the opposite tapes 48, these gently drawing the fold down toward the apex of the chamber formed between tapes 48 and 506.

The momentum given the half 302 by the needle roll 70', at the moment of release supplemented by the frictional action of the tapes 506, throws the half 302 down upon the guides 9, as soon as it is released from the needle roll 70'. This position is shown by the dot-and-dash line of Fig. 10, and by the full lines of Fig. 11.

Just prior to the cover section reaching this position, the fingers 204 are thrown down, catching the upper edge of the half section 301 between them and the bar 207, detaining this half of the section and holding the section opened for the reception of the filler sections. The upper or free margins of the cover section rest upon the ledges 90 with its edge under the ledge 91, so that the incoming filler section delivered through the tapes 156 cannot get under it.

The filler sections 303 and 304, when released by removal of the stops 82, 85, are shot out from between their tapes into the opened cover section, these being shown in Fig. 11 as emerging from their conveying tapes. As soon as these filler sections have been fairly entered within the cover section, the fingers 204 may be withdrawn, releasing the upper half of this section and permitting it to fall, as has been shown in Fig. 9. At the time the filler sections are in their final position, or possibly a mere instant in advance of this, the stop 821 is removed and the stuffed paper discharged between tapes 97, 98. By releasing stops 821 just in advance of final seating of the filler sections, the momentum of the latter may be utilized to start the stuffed paper through the delivery tapes.

The release of the upper half of the cover section by the fingers 204, may occur at any time after the filler sections have entered the cover section and before they have become seated therein. Such condition is shown in Fig. 9.

It will be noted that the tapes 48 and 506 and fingers 9 form an assembling or stuffing chamber of triangular shape, converging at the discharge end where it communicates with conveying tapes 97, 98, and that the axis of this chamber, that is the line which bisects the angle between its sides, extends across the line of discharge of the cover section. The position and general arrangement of these parts each contribute its part in the successful operation of the device.

The movement of tapes 506 in a direction transversely of the path of movement of the cover section by engagement with the side of the cover section which is lowermost during the stuffing operation, combines with the throwing action of the needles of roll 70', to quickly throw the lower half of the cover section down flat. The position of the paper at this time is such as insures correct insertion of the filler sections.

The paper opening means composed of the needle rolls 70 and 70', may be set to open a stuffed section, that is, one which is composed of two or more sections, and to open it at any point desired. If it is desired to open it at the center, the needles should be projected enough to pass through the outer sections and effectively engage opposite sides of the innermost section, or to cause the needles of each roll to engage the section of paper lying at its side of the place where the paper is to be opened. This point of opening such a section need not be at the center, but may be made at either side of the center, this being secured by causing the needles of one roll to project more than the needles of the other. The needles of the two rolls should not overlap. The use of this opening mechanism is not limited to newspapers alone but may be applied to books, pamphlets, circulars, etc.

Having thus described my invention, what I claim as new, and desire to secure by Letters Patent of the United States of America, is:—

1. In a paper stuffing machine, a mechanism for opening a folded paper having two uniformly moving paper feeding members engaging opposite sides of a folded paper and operating at rates of feed which are different for the respective sides.

2. A mechanism for opening a folded paper having two paper feeding members between which the folded paper passes, means for actuating said members in like direction but at rates of feed which are constant but differ as between the sides.

3. A mechanism for opening a folded paper having two feed rolls turning at constant but different rates between which the folded paper is passed.

4. A mechanism for opening folded papers having two needle rollers turning at constant but different peripheral speeds between which the folded paper is passed.

5. A device for opening folded papers comprising two uniformly rotated opposed feed rolls between which the paper passes folded edge first, and means for turning one roll at a higher peripheral speed than the other.

6. In a paper stuffing machine, a paper opening mechanism having two paper feeding members engaging opposite sides of a paper and having different rates of feed, and means for momentarily holding the edge of the slower-moving half of the paper just after it is discharged from the feeding members.

7. In a paper stuffing machine, a paper opening mechanism having two paper feeding members engaging opposite sides of a paper and having different rates of feed, and two gripping members momentarily engaging the edge of the slower moving half of the paper after it is discharged from the said feeding members.

8. A paper opening mechanism having two feed rolls turning at different rates between which the paper is passed, gripping members between which the paper passes after leaving said rolls and means for bringing said gripping members momentarily into contact after one half of the paper has passed and before the other half has passed.

9. In a paper stuffing machine, in combination, a paper opening mechanism comprising two rolls through which the cover section is passed folded edge first, one of said rolls having a peripheral speed greater than that of the other, and means for delivering insert sections to pass in a direction to intersect with the cover section after passing the opening rolls and from the side engaged by the roll having the greater peripheral speed.

10. In a paper stuffing machine, a paper opening mechanism having two paper feeding members engaging opposite sides of a paper and having different rates of feed, receiving members for the paper after delivery from the opening rolls extending at an angle to the line of delivery from said rolls, and means for momentarily gripping the last edge of the paper delivered from the opening rolls.

11. In a paper stuffing machine, a paper opening mechanism having two paper feeding members engaging opposite sides of a paper and having different rates of feed, and a conveyer acting upon the paper as discharged from the feeding members to deflect it laterally toward the side of the slower acting of said members.

12. In a paper stuffing machine, a paper opening mechanism having two paper feeding members engaging opposite sides of a paper and having different rates of feed, and conveyer tapes extending at an angle across the line of feed and engaging the paper discharged from said feed mechanism to deflect it laterally toward the side of the slower acting of said members.

13. In a paper stuffing machine, a paper opening mechanism having two paper feeding members engaging opposite sides of a paper and having different rates of feed, conveyer tapes extending at an angle across the line of feed and engaging the paper discharged from said feed mechanism to deflect it laterally toward the side of the slower acting of said members, and means for momentarily gripping and holding the edge of the paper last discharged from said feeding members.

14. A paper opening mechanism having two feed rolls turning at different rates between which the paper is passed, paper gripping means acting between the release of the two halves of the paper to grip the slower moving half and receiving members inclined to the direction of discharge from said opening rollers and engaging the paper in advance of its final release from said opening rollers.

15. A paper opening mechanism having two paper feeding members between which the paper passes, said members having uniform but different rates of feed, and means for discharging filler sections between the halves of the paper while separated.

16. A paper opening device having two paper engaging members acting upon opposite sides of the same paper section to produce relative movement therebetween, and means for momentarily holding one side of the paper after the other has been released.

17. A mechanism for opening a folded paper, comprising two feed rollers having feeding engagement with opposite sides of the folded paper, means for maintaining different and uniform feeding speeds in said rollers, a paper clamping mechanism between which the paper passes when discharged from said rolls, and means for actuating said clamping mechanism to hold the delayed half of the paper after the more rapidly actuated side of the paper had passed between.

18. A paper opening device having two paper engaging members acting upon opposite sides of the same paper section to produce relative movement therebetween, means for separately delivering each paper section to the assembling point, timing stops controlling the discharge from each delivering mechanism, and a gripping mechanism engaging one half of the cover section after the other half has passed the gripping point.

19. A paper opening device having two paper engaging members acting upon opposite sides of the same paper section to produce relative movement therebetween, a member past which the paper passes after leaving the opening device, and a movable gripper member adapted to engage the paper therebetween.

20. In a paper stuffing machine, in combination, a plurality of paper conveying mechanisms each delivering one of a group of papers to a common assembling point, means for timing said mechanisms to cause one to deliver its paper in advance of the others and said others to deliver their papers simultaneously, and an opening mechanism acting upon the paper first delivered and containing opposed feeding mechanism operating in like direction at different rates to thereby open the paper to receive within it the other papers side by side.

21. In a paper stuffing machine, in combination, a plurality of paper conveying mechanisms each delivering one of a group of papers to a common assembling point, an outer one of said mechanisms delivering its paper in advance of the others and containing an opening mechanism having two feeding members operating in like directions at different speeds, and engaging opposite sides of a folded paper to open it for the reception of the other papers of the group.

22. In a paper stuffing machine, in combination, a plurality of paper conveying mechanisms each delivering one of a group of papers to a common assembling point, an outer one of said mechanisms delivering its paper in advance of the others and containing an opening mechanism having two feeding members operating in like directions at different speeds, that one of said feeding mechanisms which is toward the other feeding mechanisms operating at the greater speed to thereby open the paper, the other feeding mechanism delivering their papers side by side within said opened paper.

23. In a paper stuffing machine, in combination, a plurality of paper conveying mechanisms each delivering one of a group of papers to a common assembling point, an opening mechanism acting upon the papers delivered by an outer one of said mechanisms and containing opposed feeding mechanisms operating in like directions at different rates, and a support receiving the half of the paper which is first released and extending at an angle across the line of discharge of the cover section, the other feeding mechanisms simultaneously delivering their papers side by side within said first section.

24. In a paper stuffing machine, in combination, a plurality of paper conveying mechanisms each delivering one of a group of papers to a common assembling point, an opening mechanism acting upon the papers delivered by an outer one of said mechanisms and containing opposed feeding mechanisms operating in like directions at different rates, and a support receiving the half of the paper which is first released and extending at an angle across the line of discharge of the cover section, said support lying below the discharge point of the other paper delivering mechanisms.

25. A paper stuffing machine comprising means for separately delivering the respective sections of a paper to a common point, means for discharging one half of the cover section in advance of the other, an assembling chamber having opposite sides provided with moving members acting to continue the advance of the papers, said moving members converging toward the final delivery point.

26. A paper stuffing machine comprising means for separately delivering the respective sections of a paper to a common point, means for discharging one-half of the cover section in advance of the other, an assembling chamber having feed tapes at opposite sides thereof converging and moving toward the point of final delivery.

27. A paper stuffing machine comprising means for separately delivering the respective sections of a paper to a common point, means for discharging one half of the cover section in advance of the other, a conveyer member traveling across the line of discharge of the cover section and engaging said section before it is released by the opening means.

28. A paper stuffing machine comprising means for separately delivering the respective sections of a paper to a common point, means for discharging one half of the cover section in advance of the other, a conveyer member traveling across the line of discharge of the cover section and engaging said section before it is released by the opening means, and stationary supports for the outer edge of the cover section maintaining it out of contact with the said conveyer member.

29. A paper opening machine comprising feed rolls having different peripheral speeds between which the paper is fed, tapes having their active side moving away from the slower of said rolls in a direction inclined away from the direction of discharge of the paper from said rolls, and other tapes moving transversely across said direction of discharge of the papers and contacting with the paper before it is released from the said feed rolls.

30. A paper opening device comprising feed rolls having different peripheral speeds between which the paper is discharged, two sets of converging tapes located, one at each side of the paper as discharged and both of said tapes moving with the paper, both of said tapes being inclined in the same direction relative to the line of discharge of the paper, and means for momentarily retaining the edge of that side of the paper last discharged after discharge from said rolls.

31. A paper stuffing mechanism comprising feed rolls between which folded papers are passed with their folded edges in advance, means for giving said rolls unequal peripheral speeds whereby the folded paper is opened while passing through and means for delivering a plurality of insert sections within said opened section disposed side-by-side.

32. A paper stuffing mechanism comprising feed rolls between which a folded paper is passed with its folded edge in advance, means for rotating said rolls at unequal peripheral speeds, and means for simultaneously introducing a plurality of insert sections side by side within the opened cover section.

33. A paper stuffing mechanism comprising feed rolls between which a folded paper is passed with its folded edge in advance, means for rotating said rolls at unequal peripheral speeds, and a plurality of means each introducing an insert section within the opening cover section.

34. A newspaper stuffing machine comprising a series of paper delivering means delivering the paper sections along converging lines to a common stuffing chamber, means for timing one of the outer paper delivering means to deliver its paper section in advance of the others, and an opening means acting upon this latter section and containing two feed rolls operated at different rates of speed and engaging respectively with opposite sides of the paper, and means for momentarily holding after discharge from said feed rollers the half of the paper which is last discharged.

35. A newspaper opening roll having a series of projecting needles, means for simultaneously adjusting the projection of all the needles, and means for clamping the needles when adjusted.

36. A newspaper opening roll having a recess in one end forming a flange which is also reduced in exterior diameter and threaded exteriorly and interiorly, said flange toward its base having a series of radial bores extending in a ring about it, a series of needles in said bores, the exterior of said flange having a radially positioned ledge intersecting the needle-receiving bores, a needle clamping ring screwing on the outside of said flange and a needle adjusting member screwing within the flange and having a coned surface engaging the needles to project them, and individual springs engaging the needles to retract them Signed at Seattle, Washington this 5th day of June 1915.

SEVERIN HALVORSEN.